United States Patent Office 3,252,844
Patented May 24, 1966

3,252,844
METHOD OF OBTAINING A MATTE SURFACE ON POLYCARBONATE
Wilhelm Hechelhammer, Krefeld-Bockum, and Hugo Streib, Krefeld-Uerdingen, Germany, assignors to Farbenfabriken Bayer Aktiengesellschaft, Leverkusen, Germany, a corporation of Germany
No Drawing. Filed Feb. 14, 1962, Ser. No. 173,109
Claims priority, application Germany, Feb. 16, 1961, F 33,212
4 Claims. (Cl. 156—2)

This invention relates generally to polycarbonate plastics and more particularly to an improved method of making shaped articles having a roughened or matte surface from high molecular weight thermoplastic polycarbonates.

Shaped articles such as household articles, articles used in industry, sheets, foils, bristles, fibers and the like, are prepared from high molecular weight thermoplastic polycarbonates produced from aromatic dihydroxy compounds and phosgene or its equivalent. Such articles ordinarily have a smooth surface and are practically colorless and transparent unless the polycarbonate is dyed or otherwise colored. For many purposes the glossy, smooth surface is highly desirable, but for some purposes it is necessary to have a roughened or matted surface. This matted surface has been provided in the past either by using a rough surfaced die during the melting process or by adding a matting agent to the melt or solution of polycarbonate from which the molded article is produced. It is difficult to provide a homogeneous dispersion in the highly viscous melt used for molding polycarbonate objects. Furthermore, it is inconvenient to include matting agents in the polycarbonate because this necessitates the use of a different material for molding objects to have a matted surface from that used for making objects which are to have a smooth glossy surface. Moreover, the surface of the objects prepared from material having a matting agent are smooth and only appear to be matted. Another disadvantage of using the matting agent is that objects used for covering light sources can not be prepared from such materials because the matting agent absorbs light.

It is, therefore, an object of this invention to provide shaped polycarbonate articles having an improved matte surface. Another object of the invention is to provide and improved method for providing shaped polycarbonate articles with matte surfaces. Still another object of the invention is to provide a simple method for providing polycarbonate articles with a roughened or matte surface.

The foregoing objects and others are accomplished in accordance with this invention, generally speaking, by providing a method for providing shaped articles prepared from high molecular weight thermoplastic polycarbonates with a matte finish, wherein the shaped article is submerged in an aqueous or alcoholic solution of alkali metal hydroxide or alkaline earth metal hydroxide. It has been found that an aqueous or alcoholic solution of an alkali metal hydroxide or alkaline earth metal hydroxide will impart a matte finish to a polycarbonate plastic article in a relatively short time either at room temperature or at an elevated temperature. As soon as the desired matte finish is obtained the article is washed with water until substantially all of the alkali metal hydroxide or alkaline earth metal hydroxide has been removed. The treatment of the surface of the polycarbonate article with the solution provided by this invention does not deleteriously affect the chemical, mechanical and electrical properties of the polycarbonate plastic.

As indicated above, the treatment can be either at room temperature of about 20° C. or an elevated temperature. Etching proceeds more rapidly at an elevated temperature than at room temperature so it is preferred to subject the polycarbonate articles to the solution at a temperature of from about 80° C. to about 120° C. The period of time at which the polycarbonate plastic article is treated in accordance with this invention will vary with the type of matte finish desired, but will usually not exceed several minutes. Usually dipping the article in the solution for a few seconds will produce a roughened surface suitable for most purposes. The article can be dipped in the treating solution intermittently or a continuous process can be used in which the article moves continuously through the solution until the desired surface is obtained.

The surfaces produced on polycarbonate articles in accordance with this invention are rough and are suitable for writing, printing and painting. It is possible to write on the roughened surface with a pencil or with ink, such as India ink of the type used by draftsmen. The surface can also be dyed with a suitable solution or paste of a dye stuff. One of the advantages of the polycarbonate article having the roughened surface provided by this invention is that it can be readily marked upon with a pencil and the mark can be easily erased with a suitable eraser. Films or sheets of polycarbonate prepared in accordance with this invention have been found to be well suited for use by draftsmen for making drawings or for tracing drawings. In addition, films or sheets treated in accordance with this invention can be used for packing and for making containers. Furthermore, the invention can be used to make matte surfaced fibers, bristles, strips and various other molded objects. Polycarbonates treated in accordance with this invention can be used for making articles, such as plates, troughs, tubes and the like used to cover light sources to improve light diffusion without excessive light absorption.

Various types of shaped polycarbonate articles including sheets or films can be treated on all sides or only one side as desired. Only parts of a surface can be provided with the matte finish by protecting the remainder of the surface from the solution with a suitable stencil.

Furthermore, objects dyed or colored with pigments can be provided with a matte surface. Transparent dyed formed bodies, such as discs for signal lamps, can also be matted. The sheet material used for making street signs, which is usually covered with reflecting parts, has an improved reflectability imparted to it by the matting. Furthermore, formed bodies which are to be lacquered, metallized, or provided with foils of metals, other plastics, woven textiles, paper and the like or which are to serve as intermediate layers between foils or woven materials made from natural or synthetic, organic or inorganic fibers, are given better adhesion properties by the matting.

The process according to the invention can be applied to unstretched or stretched or otherwise subsequently treated formed bodies. If desired, formed bodies treated according to the process of the invention can also be subsequently treated in any desired manner.

The following examples are given for the purpose of illustrating the present invention.

*Example 1*

About a 100μ thick foil produced from a melt of bis-(p-hydroxy-phenyl)-dimethyl-methane polycarbonate with a relative viscosity of about 1.31, measured in about 0.5% methylene chloride solution at about 20° C., is dipped at a temperature of about 80 to about 120° C. for about 60 seconds into about 50% aqueous solution of sodium hydroxide. The foil is subsequently thoroughly freed from water, quickly dipped into acetic acid and again freed from water and dried. A foil is obtained with homogeneous matte and roughened surfaces which can be written upon or printed. The chemical, mechanical and electrical properties of the foil are practically unchanged.

*Example 2*

A hollow spheroid with a wall thickness of about 2 mm. prepared from the same polycarbonate as used in Example 1 by injection molding is dipped at about 130° C. for about 8 minutes into about 50% aqueous sodium hydroxide solution. The surface is subsequently thoroughly washed with water, acetic acid and again with water and dried. A body is obtained which is suitable for a light covering which gives a subdued diffused light.

*Example 3*

Dye test plates are produced in known manner by injection molding with the use of dull, black-dyed, high molecular weight thermoplastic bis(p-hydroxy-phenyl)-dimethylmethane polycarbonate with a relative viscosity of about 1.30 (measured in about 0.5% solution in methylene chloride at about 20° C.). The sheets finished in a polished form possess a warmly-colored, highly-glossy black surface. They are subsequently dipped for about 60 seconds in about 50% sodium hydroxide solution at about 100° C., briefly washed with water, subsequently dipped into acetic acid, again washed and dried.

The parts then possess a homogeneous, matte-black, ebony like surface such as is desirable, for example, for housings for photographic apparatus, sunshades, decorative purposes and domestic articles.

Before the treatment described, it is sometimes advantageous to clean the injection molded parts with suitable fluids, such as ligroin.

Any other suitable polycarbonate can be substituted for the one in the foregoing examples. Polycarbonates which can be used in preparing articles to be treated in accordance with this invention are described in Canadian Patents 578,585 and 578,795. In fact, the invention is applicable to any polycarbonate prepared from a di(monohydroxide aryl) alkane and phosgene or a bis(chloro carbonic acid) ester of a di(mono-hydroxide aryl) alkane. Since the invention here does not pertain to the preparation of the polycarbonate, but to the subsequent treatment thereof, reference is made to the Canadian patents and other published articles for the preparation of the polycarbonates. Thermoplastic film-forming polyester of carbonic acid and a di(mono-hydroxy aryl) alkane are preferred.

Other suitable polycarbonates are such which are prepared by methods well known in the art, for instance, from di(monohydroxy aryl)-ethers, -sulphides, -sulphones, and -sulphoxides, from mixtures of different di(monohydroxy aryl) alkanes and their equivalents mentioned above and from mixtures thereof with other aromatic, aliphatic and cycloaliphatic dihydroxy compounds and from mixtures of other aromatic dihydroxy compounds such as hydroquinone, resorcinol, and dihydroxydiphenyls, and from mixtures thereof with aliphatic and cycloaliphatic dihydroxy compounds. The term polycarbonate means polymeric carbonic acid esters with an average molecular weight of at least about 10,000 and more up to about 200,000–300,000.

Another alkali metal hydroxide or alkaline earth metal hydroxide can be substituted for the one used in the foregoing examples. Examples of suitable alkali metal hydroxide and alkaline earth metal hydroxide are sodium hydroxide, potassium hydroxide, lithium hydroxide, barium hydroxide, magnesium hydroxide, calcium hydroxide and the like. Best results are obtained with a solution containing from about 10% by weight to about 50% by weight of the alkali metal hydroxide or alkaline earth metal hydroxide. As indicated hereinbefore, the alkali metal hydroxide or alkaline earth metal hydroxide or mixtures thereof can be dissolved in water or a suitable alcohol such as ethanol, methanol, isopropanol, butanol or the like.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for imparting a matte finish to the surface of a shaped polycarbonate article substantially instantaneously which comprises treating the surface with a solution of a member selected from the group consisting of alkali metal hydroxide and alkaline earth metal hydroxide at a concentration of about 50% and at a temperature of between about 80° C. and about 120° C.

2. The process of claim 1 wherein an aqueous solution of an alkali metal hydroxide is used.

3. The process of claim 1 wherein the polycarbonate is subjected to an aqueous sodium hydroxide solution.

4. The process of claim 1 wherein the group member is in solution in a member selected from the group consisting of ethanol, methanol, isopropanol and butanol.

References Cited by the Examiner

UNITED STATES PATENTS

| | | | |
|---|---|---|---|
| 2,312,296 | 2/1943 | Hempel | 117—47 |
| 2,708,617 | 5/1955 | Magat et al. | |
| 2,764,502 | 9/1956 | Emerson | 117—47 |
| 2,789,063 | 4/1957 | Purvis et al. | 117—47 |
| 2,968,538 | 1/1961 | Chapman | 156—2 |

FOREIGN PATENTS 1,096,036   12/1960   Germany.

OTHER REFERENCES

G.E.: Lexan Polycarbonate Resin Pamphlet, in 260–47X Chemical Materials Dept., Pittsfield, Mass. Section on Technical Report on Lexan Polycarbonate Films, page 6. Dated Preliminary data June 5, 1961.

G.E.: First Polycarbonate Applications, Reprint from December 1958, issue of Modern Plastics, published by G.E., Pittsfield, Mass.; 4 pages, see pp. 2 and 3.

Schnell, H.: Linear Aromatic Polyesters of Carbonic Acid, article in Industrial and Engineering Chemistry, vol. 51, January-April 1959, TPIA 58, pages 157–160, see specifically 51 No. 2, February 1959, page 159, par. 2 and 3 in column 3.

ALEXANDER WYMAN, *Primary Examiner.*

JACOB STEINBERG, EARL M. BERGERT,
*Examiners.*